(12) United States Patent
Kusase

(10) Patent No.: US 6,724,115 B2
(45) Date of Patent: Apr. 20, 2004

(54) HIGH ELECTRICAL AND MECHANICAL RESPONSE STRUCTURE OF MOTOR-GENERATOR

(75) Inventor: Shin Kusase, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/269,881

(22) Filed: Oct. 15, 2002

(65) Prior Publication Data

US 2003/0102756 A1 Jun. 5, 2003

(30) Foreign Application Priority Data

Oct. 24, 2001 (JP) ........................................ 2001-325976

(51) Int. Cl.⁷ ............................................. H02K 21/12
(52) U.S. Cl. ............................ 310/156.26; 310/156.37; 310/156.49; 310/261; 310/113
(58) Field of Search ...................... 310/156.26, 156.37, 310/156.43, 156.49–156.84, 113–115, 254, 261

(56) References Cited

U.S. PATENT DOCUMENTS

| | | | | |
|---|---|---|---|---|
| 5,691,590 A | * | 11/1997 | Kawai et al. ................ | 310/180 |
| 5,793,143 A | * | 8/1998 | Harris et al. ................. | 310/263 |
| 5,793,144 A | * | 8/1998 | Kusase et al. ............... | 310/263 |
| 5,892,311 A | * | 4/1999 | Hayasaka .................... | 310/166 |
| 5,952,758 A | * | 9/1999 | Lucidarme et al. ......... | 310/162 |
| 6,429,566 B1 | * | 8/2002 | Kuwahara .............. | 310/156.56 |
| 6,563,246 B1 | * | 5/2003 | Kajiura et al. .............. | 310/162 |

* cited by examiner

Primary Examiner—Thanh Lam
(74) Attorney, Agent, or Firm—Oliff & Berridge, PLC

(57) ABSTRACT

An AC motor-generator includes a rotor made up of a first inductor core and a second inductor core arrayed in an axial direction of a rotary shaft. A plurality of permanent magnets are arrayed at an interval of $2\pi$ in electrical angle of an armature away from each other in the periphery of each of the first and second inductor cores. Each permanent magnet is magnetized in a radius direction of the first and second inductor cores so as to be opposed to a magnetomotive force produced by a field winding, thereby resulting in quick disappearance of the magnetic flux of the field upon disappearance of the magnetomotive force from the field winding.

9 Claims, 4 Drawing Sheets

$\pi/6$ : ADVANCED ANGLE

HIGH ELECTRICAL AND MECHANICAL RESPONSE STRUCTURE OF MOTOR-GENERATOR

BACKGROUND OF THE INVENTION

1 Technical Field of the Invention

The present invention relates generally to a motor-generator suitable for use in vehicle such as passenger cars or trucks, and more particularly to an improved structure of such a motor-generator which have improved electrical and mechanical responses without sacrificing the performance thereof.

2 Background Art

Recently, it has become essential to reduce mechanical shocks caused by application of engine torque to auxiliary parts or engagement of an automatic transmission while the engine is idling so that the engine torque is low. In order to avoid this problem, some of typical automotive motor-generators are designed to be controlled to increase the quantity of power to be generated gradually when an electrical load is applied to the motor-generator suddenly. Additionally, in recent years, a variety of electrical parts such as electrical steering systems which consume a large quantity of power instantaneously and need a higher response and comfort of operation have been employed. The need for releasing the torque of the engine from being consumed by the auxiliary parts instantaneously is, thus, required in order to compensate for a lack of torque of the engine for driving the vehicle. This may be achieved typically by using a motor-generator driven through transistors and controlling a motor torque thereof at high speed through a vector control system.

The above system requires a complex control mechanism and transistors allowing much current to flow therethrough, and thus results in an increase in manufacturing cost. The motor-generator is employed as an electric motor, thus resulting in an increase in mechanical time constant. This requires large-sized transistors and a large capacity of a battery, thus resulting in an increase in load on a charge system. The need for altering the design of the system or using expensive parts may be eliminated by regulating a field current of the motor-generator installed in the vehicle to control the output torque thereof at high speed. The decrease in mechanical time constant may be increasing a field resistance or decreasing the number of turns of a field winding. This, however, results in a drop in degree of excitation of the field winding, which is objectionable in terms of an increase in electrical load.

SUMMARY OF THE INVENTION

It is therefore a principal object of the invention to avoid the disadvantages of the prior art.

It is another object of the invention to provide a motor-generator designed to have an improved electrical response of a magnetic field and an improved mechanical response without sacrificing the performance of the motor-generator.

According to one aspect of the invention, there is provided a motor-generator which is suitable for use in automotive vehicles. The motor-generator comprises: (a) an armature including polyphase windings; (b) a field core; (c) a field winding wound around the field core; (d) a pole rotor disposed between the armature and the field core to be rotatable together with a rotary shaft, the pole rotor being made up of a first inductor core and a second inductor core arrayed adjacent each other in an axial direction of the rotary shaft; and (e) a plurality of permanent magnets arrayed at an interval of $2\pi$ in electrical angle of the armature away from each other in each of the first and second inductor cores of the pole rotor in a circumferential direction of the first and second inductor cores. Each of the permanent magnets is magnetized in a radius direction of the first and second inductor cores so as to be opposed to a magnetomotive force produced by the field winding, thereby resulting in quick disappearance of the magnetic flux of the field upon disappearance of the magnetomotive force from the field winding, which results in a greatly improved electrical response of the field.

In the preferred mode of the invention, a plurality of slits are formed in each of the first and second inductor cores. Each of the slits extends in the radius direction of the first and second inductor cores and is located between adjacent two of the permanent magnets. The slits may be arrayed at an interval of $2\pi$ in electrical angle of the armature from each other.

The motor-generator further comprises a housing to which the pole rotor is fixedly attached to form a brushless magnetic circuit. It is advisable that each of the permanent magnets be located closer to the armature than the field core in the radius direction of the first and second inductor cores. This results in an increase in magnetic force acting on the armature. The formation of the brushless magnetic circuit results in an increase in air gap within a main magnetic circuit. The installation of the permanent magnets in the main magnetic circuit results in an increase in magnetic resistance of the main magnetic circuit, which leads to a great decrease in inductance of the main magnetic circuit. Mechanically, a rotating portion is allowed to have a minimum structure including the pole rotor. The magnetic flux passes directly from the field core to the armature, thus permitting the size or weight of the rotating portion to be reduced, which results in an improved mechanical response thereof. The presence of the permanent magnets in the vicinity of the armature results in improved permeability of the magnetic flux from the field core to the pole rotor, thereby permitting the pole rotor to be reduced in size, which results in further improvement of the mechanical response.

The field core is made up of a boss around which the field winding is wound and discs attached to ends of the boss opposed to each other in the axial direction of the rotary shaft. Hollow cylinders are further provided which are disposed on peripheries of the discs, respectively, and each of which has a length greater than a thickness of the discs in the axial direction of the rotary shaft. Each of the discs extends radially from peripheral edges of the boss to define a gap within which the field winding is installed. Each of the hollow cylinders extends over the gap close to each other through a given interval, thereby resulting in improved permeability of the magnetic flux flowing from the discs to the first and second inductor cores, which allows the pole rotor to be reduced in size, thereby resulting in a decrease in mechanical inertia.

The AC motor-generator further comprises a second permanent magnet which is disposed between the first and second inductor cores of the pole rotor. The second permanent magnet is magnetized so as to be opposed to the magnetomotive force produced by the field winding, thereby avoiding leakage of magnetic flux to between the first and second inductor cores and adding the magnetic flux produced by the second permanent magnet to the armature as the magnetic flux of the field, which improves an output of the AC motor-generator or allows the pole rotor to be reduced in size if the output of the AC motor-generator is kept constant, thus resulting in a decrease in mechanical inertia.

The AC motor-generator further comprises a magnetic flux leakage deterrent permanent magnet disposed between the field winding and the pole rotor which is so magnetized as to decrease a leakage of magnetic flux into between the discs of the field core. The magnetic flux leakage deterrent permanent magnet also works to add the magnetic flux produced thereby to the armature as the magnetic flux of the field, which improves an, output of the AC motor-generator or allows the pole rotor to be reduced in size if the output of the AC motor-generator is kept constant, thus resulting in a decrease in mechanical inertia.

The AC motor-generator further comprises a control circuit which works to energize the field winding and change a direction in which the field winding is energized. Even when the field winding is not energized, the permanent magnets continue to produce the magnetic flux, so that a small amount of power is being generated. The control circuit works to suppress the generation of power.

BRIEF DESPCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

DESCRIPTION OF THE PREFERRED EMBODIMENTS

Figure 1:
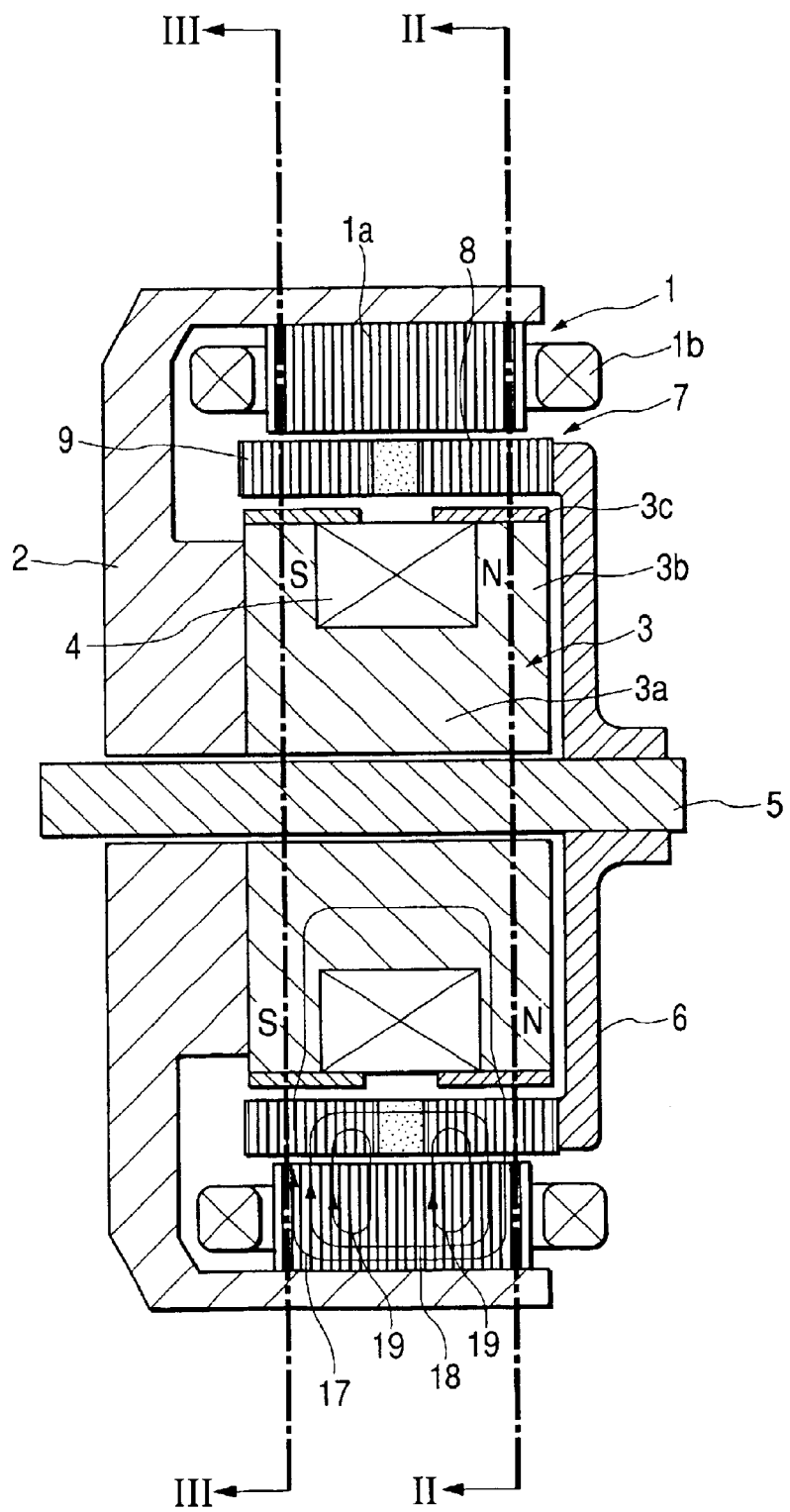
FIG. 1 is a partially sectional view which shows an automotive AC generator according to the invention.
Figure 2:
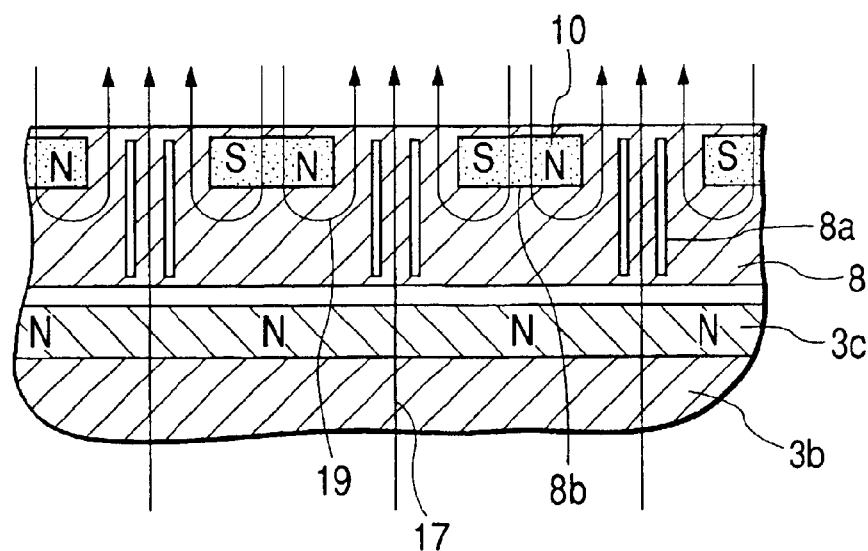
FIG. 2 is a partially sectional view taken along the line II—II in FIG. 1.
Figure 3:
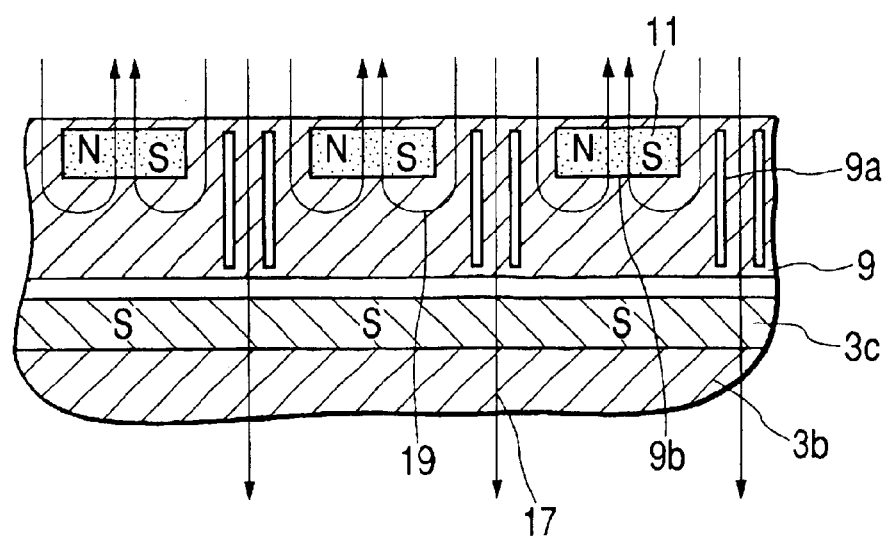
FIG. 3 is a partially sectional view taken along the line III—III in FIG. 1.

Referring to the drawings, wherein like reference numbers refer to like parts in several views, particularly to FIGS. 1 to 3, there is shown an AC generator for automotive vehicles according to the invention.

The illustrated AC generator works as a motor-generator and includes an armature 1, a housing 2, a field core 3, a field winding 4, a rotary shaft 5, a rotor holder 6, a laminated pole rotor 7, inductor core laminations 8 and 9, and permanent magnets 10 and 11.

The armature 1 includes an armature core 1a and polyphase windings 1b. The armature core 1a has formed therein a plurality of slots which have openings (not shown) oriented inwardly of the armature core 1a. The polyphase windings 1b are wound in the slots with a given pole pitch.

The field core 3 consists of a boss 3a, discs 3b, and hollow cylinders 3c. The boss 3a has a central hole through which the rotary shaft 5 passes. The discs 3b are attached to opposed ends of the boss 3a and extend radially from peripheral edges of the boss 3a to form flanges. The hollow cylinders 3c are attached fixedly to peripheries of the discs 3b and extend in approaching directions from inside edges of the discs 3b, respectively.

The armature 1, the boss 3a, and the disc 3b are installed fixedly within the housing 2. The field winding 4 is mounted around the boss 3a within a gap between the discs 3b.

The laminated pole rotor 7 is made by a stack of magnetic conductive plates and disposed between the armature core 1a and the discs 3b as an inductor working to introduce the inductance of the discs 3b and the boss 3a opposing the armature 1. The rotor 7 is attached to an end of the rotor holder 6. The rotor holder 6 is mounted fixedly on the periphery of the rotary shaft 5 so that it may rotate together with the rotary shaft 5. The rotary shaft 5 is pivotably held by the housing 2. This forms a brushless magnetic circuit.

The rotary shaft 5, the rotor holder 6, and the laminated pole rotor 7 form a field rotor. The laminated pole rotor 7 is made up essentially of a first laminated inductor core 8 and a second laminated inductor core 9 which are spaced in an axial direction of the rotary shaft 5 at a given interval away from each other. The first and second laminated inductor cores 8 and 9 have formed therein, as clearly shown in FIGS. 2 and 3, pairs of barrier slits 8a and 9a which are located at an interval of electrical angle $2\pi$ of the armature 1 away from each other and extend in the radius direction of the first and second laminated inductor cores 8 and 9. The barrier slits 8a and 9a may be formed by punching the first and second laminated inductor cores 8 and 9. Each of the barrier slits 8a and 9a may alternatively be formed at an interval of electrical angle $2\pi$ of the armature 1 away from an adjacent one or groups each consisting of more than two barrier slits may be formed at an interval of electrical angle $2\pi$ away from each other. A core slot 8b is formed between adjacent two of the pairs of the barrier slits 8a. Similarly, a core slot 9b is formed between adjacent two of the pairs of the barrier slits 9a. The permanent magnets 10 and 11 are installed within the core slots 8b and 9b, respectively, so that they may be located at an interval of electrical angle $2\pi$ of the armature 1 away from each other.

Each of the permanent magnets 10 is magnetized in a radius direction of the first laminated inductor core 8 oriented to a magnetomotive force produced by the field winding 4. Similarly, each of the permanent magnets 11 are magnetized in a radius direction of the second laminated inductor core 9 oriented to the magnetomotive force produced by the field winding 4. Specifically, each of the permanent magnets 10 installed in the first laminated inductor core 8, as clearly shown in FIG. 2, has the S-pole at the outside and the N-pole at the inside thereof. Each of the permanent magnets 11 installed in the second laminated inductor core 9, as clearly shown in FIG. 3, has the N-pole at the outside and the S-pole at the inside thereof. Directions in which the permanent magnets 8 and 9 are magnetized are opposite directions in which the discs 3c are magnetized.

Figure 4:
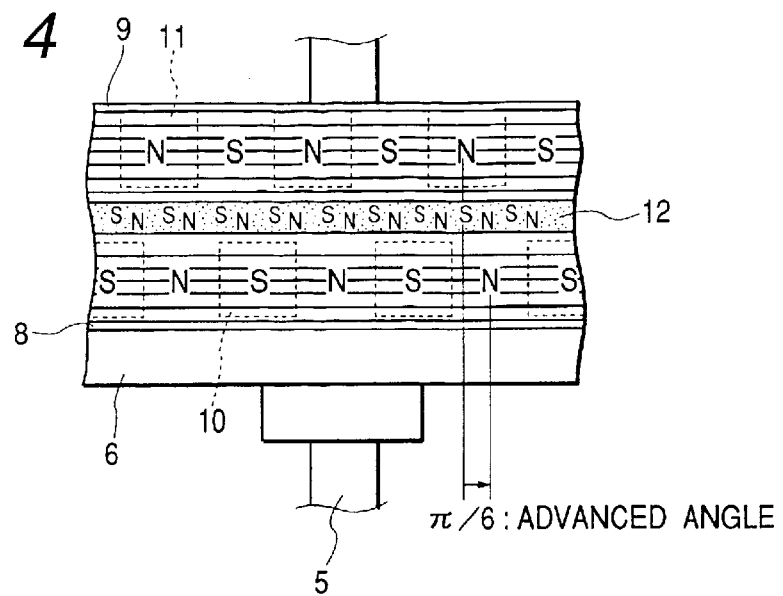
FIG. 4 is a partially developed view which shows a side of a pole rotor.

The first and second laminated inductor cores 8 and 9 are, as clearly shown in FIG. 4, disposed at an interval away from each other through a permanent magnet 12. The permanent magnets 10 in the first laminated inductor core 8 and the permanent magnets 11 in the second laminated inductor core 9 form the N-poles and the S-poles which are so arrayed that the same poles partially overlap with each other in the axial direction of the rotary shaft 5. Specifically, each of the N-poles and the S-poles created on the outer periphery of the first laminated inductor core 8 is shifted $\pi/6$ (i.e., 30°) in electric angle of the armature 1 from the same pole created on the outer periphery of the second laminated inductor core 9 in a direction of rotation of the rotor 7.

The core slots 8b within which the permanent magnets 10 of the first laminated inductor core 8 are fitted are located closer to the armature 1 than the outer periphery of the disc 3b in the radius direction of the first laminated inductor core 8. Specifically, the core slots 8b and the permanent magnets 10 are biased outward from the circumferential center of the first laminated inductor core 8. Similarly, the core slots 9b within which the permanent magnets 11 of the second laminated inductor core 9 are fitted are located closer to the armature 1 then the outer periphery of the disc 3b in the radius direction of the second laminated inductor core 9. Specifically, the core slots 9b and the permanent magnets 11 are biased outward from the circumferential center of the second laminated inductor core 9.

The permanent magnet 12 is, as described above, interposed between the first and second laminated inductor core 8 and 9. The permanent magnet 12 is, as shown in FIG. 4, magnetized in a direction opposed to the magnetomotive force produced by the field winding 4 and works as a counter-bias magnet which provides a counter-bias magnetomotive force to the field winding 4.

Figure 5:
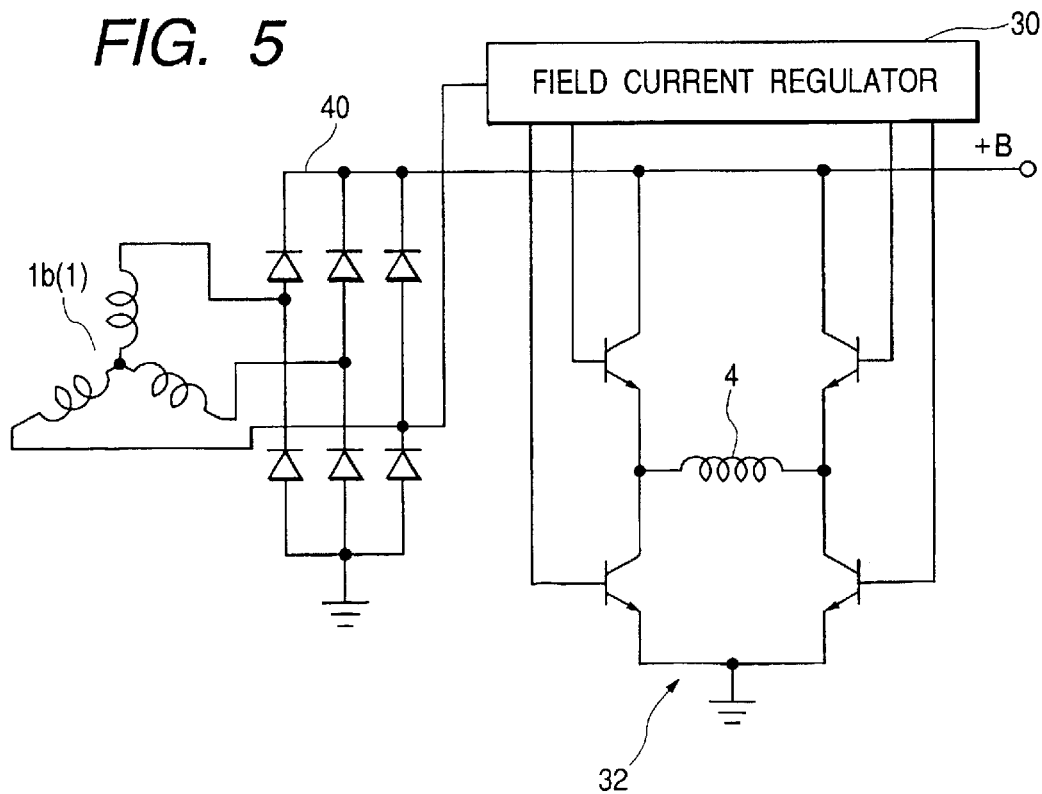
FIG. 5 is a circuit diagram which shows an electrical structure of the AC generator of FIG. 1.

FIG. 5 shows a circuit structure of the automotive AC generator of this embodiment. The AC generator includes a field current regulator 30 working as an output power controller and a H-bridge circuit 32 made up of four transistors. The field current regulator 30 is connected to the field winding 4 and works to control on and off switching operations of the transistors of the H-bridge circuit 32 so as to reverse the polarity of the voltage to be applied across the field winding 4 and regulate the current flowing therethrough, thereby reversing the orientation of the field current, i.e., the orientation of a magnetic flux produced by excitation of the field winding 4.

An operation of the AC generator will be described below. Three types of flows of magnetic fluxes will first be discussed.

The first magnetic flux 17, as shown in FIGS. 2 and 3, is produced by the excitation of the field winding 4. The discs 3b form, as shown in FIG. 1, the N-pole and the S-pole, respectively. The magnetic flux 17 emerging from the N-pole of a right one of the discs 3b, as viewed in FIG. 1, passes through the first laminated inductor core 8, as clearly shown in FIG. 2, without being obstructed by the barrier slots 8a, travels through a right portion of teeth through a core back through a left portion of the teeth of the armature core 1a, and enters the second laminated inductor core 9. Subsequently, the magnetic flux 17 passes through a left one of the discs 3b and the boss 3a and returns back to the right one of the discs 3b.

The second magnetic flux 18 is, as shown in FIG. 1, produced by the permanent magnet 12 independently of the first magnetic flux 17. The second magnetic flux 18 emerging from the N-pole of the permanent magnet 12, as shown in FIGS. 1 and 4, passes through the first laminated inductor core 8, the armature core 1a, and the second laminated inductor core 9, and returns back to the permanent magnet 12 at the S-pole.

The third magnetic fluxes 19 are produced by the permanent magnets 10 and 11 installed in the first and second laminated inductor cores 8 and 9, respectively. One of the third magnetic fluxes 19 emerging from the N-pole of each of the permanent magnets 10, as shown in FIG. 2, makes a U-turn within the first laminated inductor core 8, goes to the armature core 1a in parallel to the first magnetic flux 17, interlinks, like the other magnetic fluxes, to the polyphase windings 1b within the armature core 1a, returns back to the first laminated inductor core 9, and enters the S-pole of the permanent magnet 10. Similarly, the other third magnetic flux 19 emerging from the N-pole of each of the permanent magnets 11 of the second laminated inductor core 9 returns back thereto at the S-pole along a similar loop. Rotation of the first and second laminated inductor cores 8 and 9 each having an array of the N-poles and the S-poles in the circumferential direction thereof subjected to the first, second, and third magnetic fluxes will cause the voltage to be induced in the polyphase windings 1b of the armature 1, thereby generating the power. The AC voltage induced in the polyphase winding 1b is converted by a rectifier 40, as shown in FIG. 5, into a DC voltage.

In the absence of the field current flowing through the field winding 4, the field magnetomotive force is not produced, so that the first magnetic flux 17 is not produced. Since the field magnetomotive force is null, and the hollow cylinders 3c are mounted on the field core 3, the third magnetic fluxes 19 go to the discs 3b and the boss 3a having a lower magnetic resistance without advancing toward the armature 1 and return back to the permanent magnets 10 and 11 through a short-circuited path. The third magnetic fluxes 19, therefore, hardly contribute to the generation of power.

The second magnetic flux 18 is free from a change in field current and, thus, emerges from the N-pole of the permanent magnet 12, passes through the first laminated inductor core 8 and the armature core 1a, enters the second laminated inductor core 9, and returns back to the S-pole of the permanent magnet 12 along the same loop as described above. This results in a difficulty in eliminating the power to be produced completely in the absence of the field current in the filed winding 4. However, application of the field current to the field winding 4 in a reverse direction using the H-bridge circuit 32 controlled by the field current regulator 30 will cause the first magnetic flux 17 to be produced which is oriented in a direction opposite the second magnetic flux 18 in terms of orientation of interlinking with the armature 1, thereby nulling the power to be produced.

Rapid disappearance of the magnetic flux of the field which is established using permanent magnets 10, 11, and 12 and forms the first feature of the invention will be discussed below.

The use of the magnetic fluxes produced by the permanent magnets 10, 11, and 12 as the part of the magnetic flux of the field contributing to the generation of the power permits the magnetic flux produced by excitation of the field winding 4 to be decreased. Therefore, when the magnetomotive force disappears from the field winding 4, it will cause the magnetic flux flowing through the armature core 1a to disappear rapidly. The permanent magnets 10 and 11 installed in the first and second laminated inductor cores 8 and 9 produce a counter-magnetomotive force acting on the magnetomotive force produced by the field winding 4. The disappearance of the magnetomotive force from the field winding 4, therefore, causes the magnetic fluxes produced by the permanent magnets 10 and 11 to be oriented in a direction opposite the magnetic flux flowing within the discs 3b, so that it flows in the field core 3, thereby causing the magnetic flux flowing from the field core 3 to the armature 1 to be eliminated rapidly. The first and second laminated inductor cores 8 and 9 are so saturated that the magnetic fluxes produced only by the permanent magnets 10 and 11 are allowed to flow therethrough. Most of the magnetic fluxes produced by the permanent magnets 10 and 11 stays in the first and second laminated inductor cores 8 and 9 without passing through the armature 1. Specifically, a decrease in field current flowing through the field winding 4 will result in a rapid decrease in total magnetic flux acting on the armature 1.

A reduction in inductance of the rotor 7 which forms the second feature of the invention will be discussed below.

The inductance of the rotor 7 is inversely proportional to a magnetic resistance of a magnetic circuit thereof. The permanent magnets 10 and 11 having a considerably higher magnetic permeability approximating that of the air are disposed in series in the magnetic circuit, thus resulting in an increase in the magnetic resistance and a decrease in inductance. The automotive AC generator of this embodiment is, unlike typical automotive AC generator, of a brushless structure in which four air gaps (usually, two) are formed in series in the magnetic circuit (i.e., within the loop of the first magnetic flux 17 as shown in FIG. 1). This results in a great increase in the magnetic resistance, which leads to a decrease in the inductance. Most of the poles of the rotor 7 facing the armature 1 is made up of the first and second laminated inductor cores 8 and 9, thus reducing the effects of eddy current produced internally by magnetic induction arising from a change in magnetic flux and resultant self-flux holding. Specifically, decreasing the inductance of the field resulting in a decrease in inertia of magnetic flux dynamically, thereby improving dynamic properties of the rotor 7.

The AC generator of this embodiment is, as apparent from the above discussion, capable of regulating the quantity of power to be generated and eliminating the magnetic flux rapidly. The AC generator is lower in inductance of the field. The use of the permanent magnets 10 and 11 improves the performance of the rotor 7 and allows the size thereof to be reduced, thereby improving an electric response of the field and a mechanical response of the AC motor-generator. Additionally, a portion of the rotor 7 facing the armature 1 is formed by the first and second laminated inductor cores 8 and 9 each made up of a laminate, thus resulting in a decrease in core loss arising from the eddy current and improved passage of the magnetic flux, which contributes to the reduction in size of the rotor 7.

We assembled the AC generator in which the outer diameter of the armature 1 is 128 mm, the rated voltage is 14V, and the rated current is 150A and performed tests. Results of the tests showed that the time constant of the field is 10 ms that is approximately 1/20 of 180 ms in typical AC generators, and the inertial proportional to the mechanical time constant is decreased to 12 kgcm$^2$ that is less than half of 28 kgcm$^2$ in the typical AC generators. We have also found that the decreases in time constant of the field and the mechanical time constant permits the output current to be 180A when the output voltage is 14V, which results in an increase in approximately 20% of the output, and that the efficiency of power generation is 78% that is higher by approximately 8% than in the typical AC motors.

Figure 6:
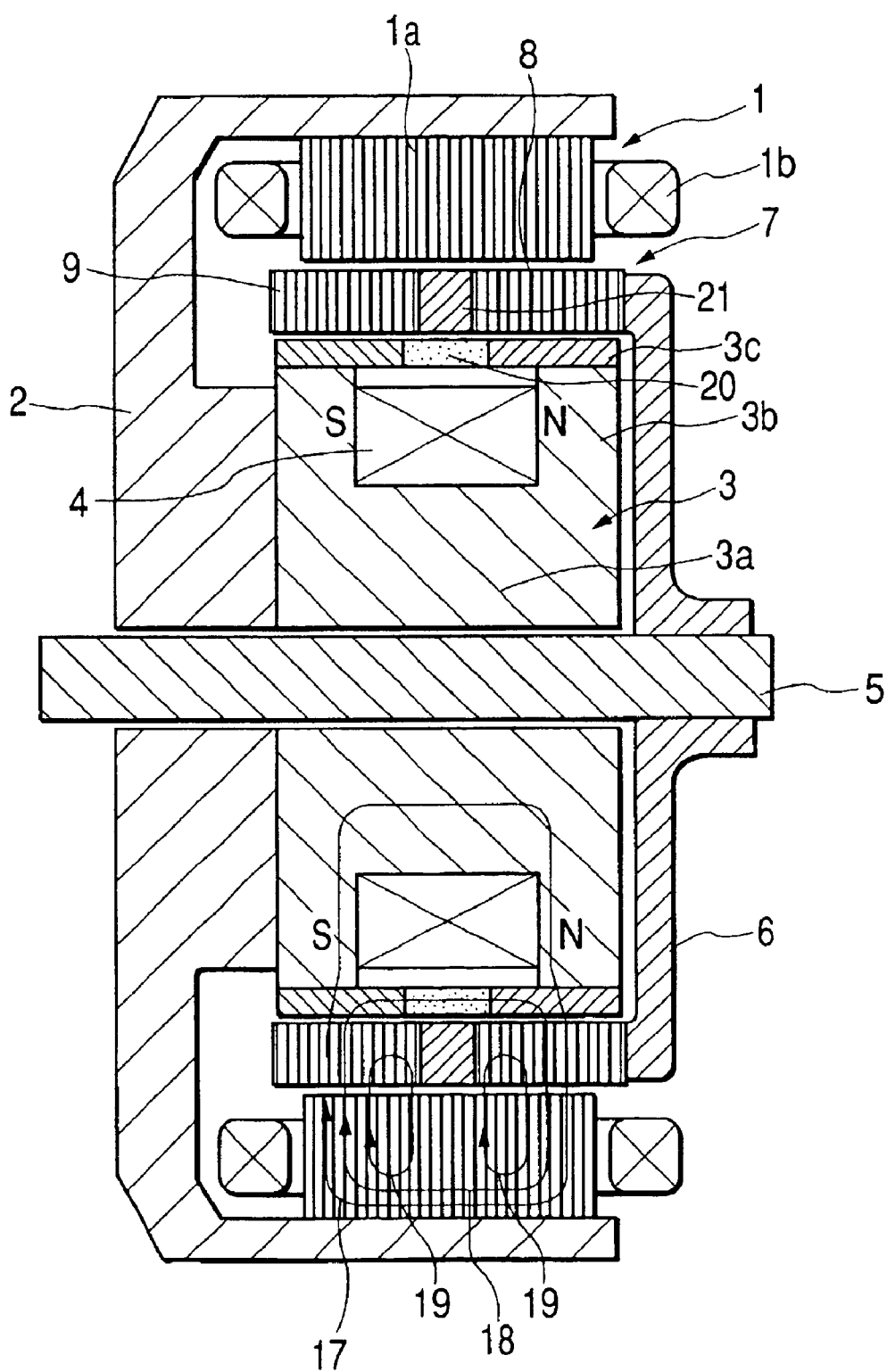
FIG. 6 is a partially sectional view which shows a modification of the AC generator of FIG. 1.

FIG. 6 shows a modification of the AC generator of the invention.

A stationary permanent magnet 20 is disposed between the field winding 4 and the laminated pole rotor 7. The stationary permanent magnet 20 is so magnetized as to avoid leakage of magnetic flux to between the discs 3b and between the cylinders 3c. An annular aluminum separator 21 is installed between the first and second laminated inductor cores 8 and 9 which has an opening serving as a ventilator for cooling the field winding 4 during rotation of the AC generator.

The permanent magnet 20 works to add the magnetic flux to the armature 1, thereby allowing the rotor 7 to be reduced in size. Particularly, the permanent magnet 20 is not installed in the rotor 7, but in the stator, so that there is no loss of the magnetomotive force within an air gap. This also eliminates the need for a space or parts for holding the permanent magnet 20 against the centrifugal force and some defects caused by, for example, an increase in inertia by the magnet 20.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims. For example, the field core 3 and the field winding 4 are connected fixedly to the housing 2 in the embodiment as described above, but may be installed on the rotary shaft 5 as the part of the rotor 7. The permanent magnets 8 and 9 are embedded completely within the first and second laminated inductor cores 8 and 9, but may have formed in ends thereof opened slots for installation of the permanent magnets 8 and 9 using adhesive or wedge-shaped slots. Instead of the first and second laminated inductor cores 8 and 9, core blocks may be used. The specifications of the cores, the air gap, and the armature, and properties of the permanent magnets may be changed as needed.

What is claimed is:

1. A motor generator comprising:
    an armature including polyphase windings;
    a field core;
    a field winding wound around said field core;
    a pole rotor disposed between said armature and said field core to be rotatable together with a rotary shaft, said pole rotor being made up of a first inductor core and a second inductor core arrayed adjacent each other in an axial direction of the rotary shaft; and
    a plurality of permanent magnets arrayed at an interval of $2\pi$ in electrical angle of said armature away from each other in each of the first and second inductor cores of said pole rotor in a circumferential direction of the first and second inductor cores, each of the permanent magnets being magnetized in a radius direction of the first and second inductor cores so as to be opposed to a magnetomotive force produced by said field winding.

2. A motor generator as set forth in claim 1, further comprising a plurality of slits formed in each of the first and second inductor cores, each of the slits extending in the radius direction of the first and second inductor cores and being located between adjacent two of said permanent magnets.

3. A motor generator as set forth in claim 2, wherein said slits are arrayed at an interval of $2\pi$ in electrical angle of said armature from each other.

4. A motor generator as set forth in claim 1, further comprising a housing to which said pole rotor is fixedly attached to form a brushless magnetic circuit, and wherein each of said permanent magnets is located closer to said armature than said field core in the radius direction of the first and second inductor cores.

5. A motor generator as set forth in claim 1, wherein said field core is made up of a boss around which said field winding is wound and discs attached to ends of the boss opposed to each other in the axial direction of the rotary shaft, and further comprising hollow cylinders which are disposed on peripheries of the discs, respectively, and each of which has a length greater than a thickness of the discs in the axial direction of the rotary shaft.

6. A motor generator as set forth in claim 5, wherein each of the discs extends radially from peripheral edges of the boss to define a gap within which said field winding is installed, each of said hollow cylinders extending over the gap close to each other through a given interval.

7. A motor generator as set forth in claim 1, further comprising a second permanent magnet which is disposed between the first and second inductor cores of said pole rotor, said second permanent magnet being magnetized so as to be opposed to the magnetomotive force produced by said field winding.

8. A motor generator as set forth in claim 1, wherein said field core is made up of a boss around which said field winding is wound and discs attached to ends of the boss opposed to each other in the axial direction of the rotary shaft, and further comprising a magnetic flux leakage deterrent permanent magnet disposed between said field winding and said pole rotor which is so magnetized as to decrease a leakage of magnetic flux into between the discs of said field core.

9. A motor generator as set forth in claim 1, further comprising a control circuit which works to energize said field winding and change a direction in which said field winding is energized.

* * * * *